Jan. 25, 1955  G. A. LYON  2,700,354
METHOD AND APPARATUS FOR MAKING WHEEL COVERS
Filed Aug. 13, 1949  3 Sheets-Sheet 1
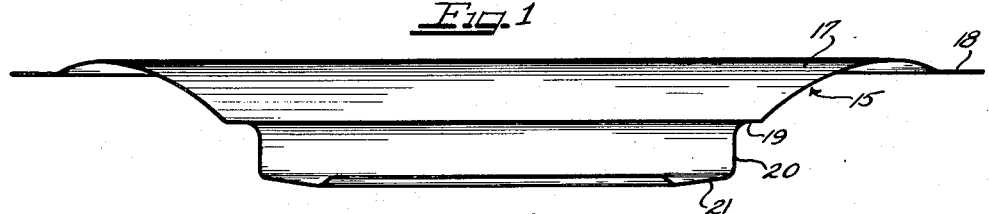
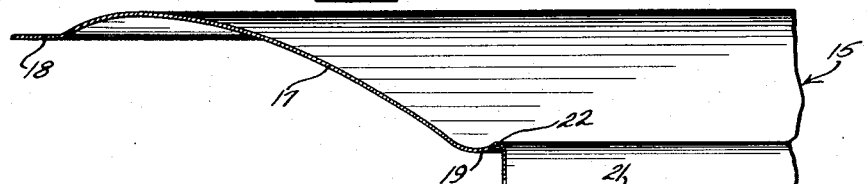
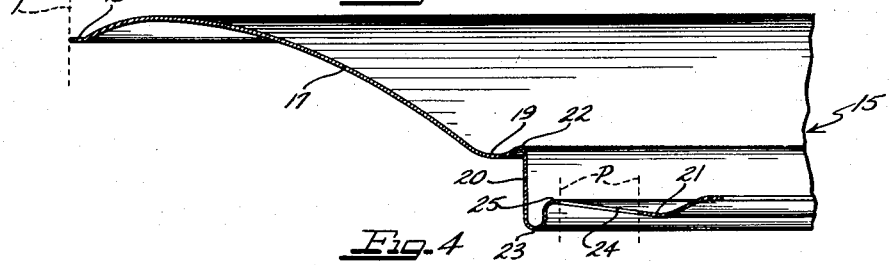
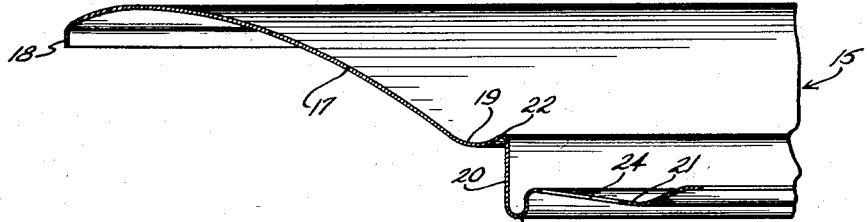
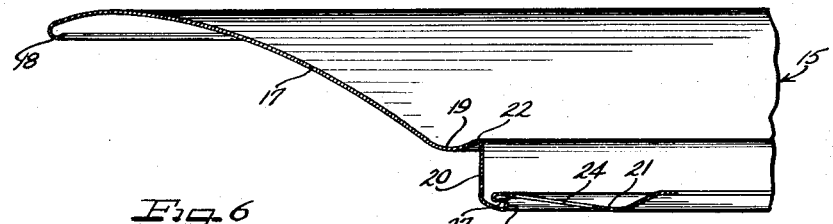
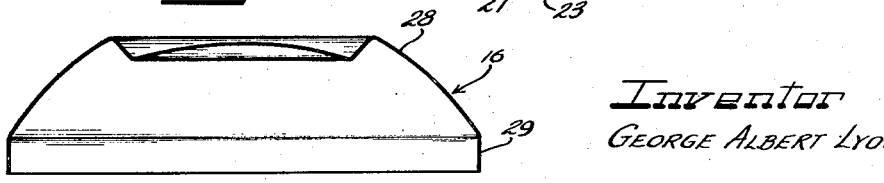
Inventor
GEORGE ALBERT LYON

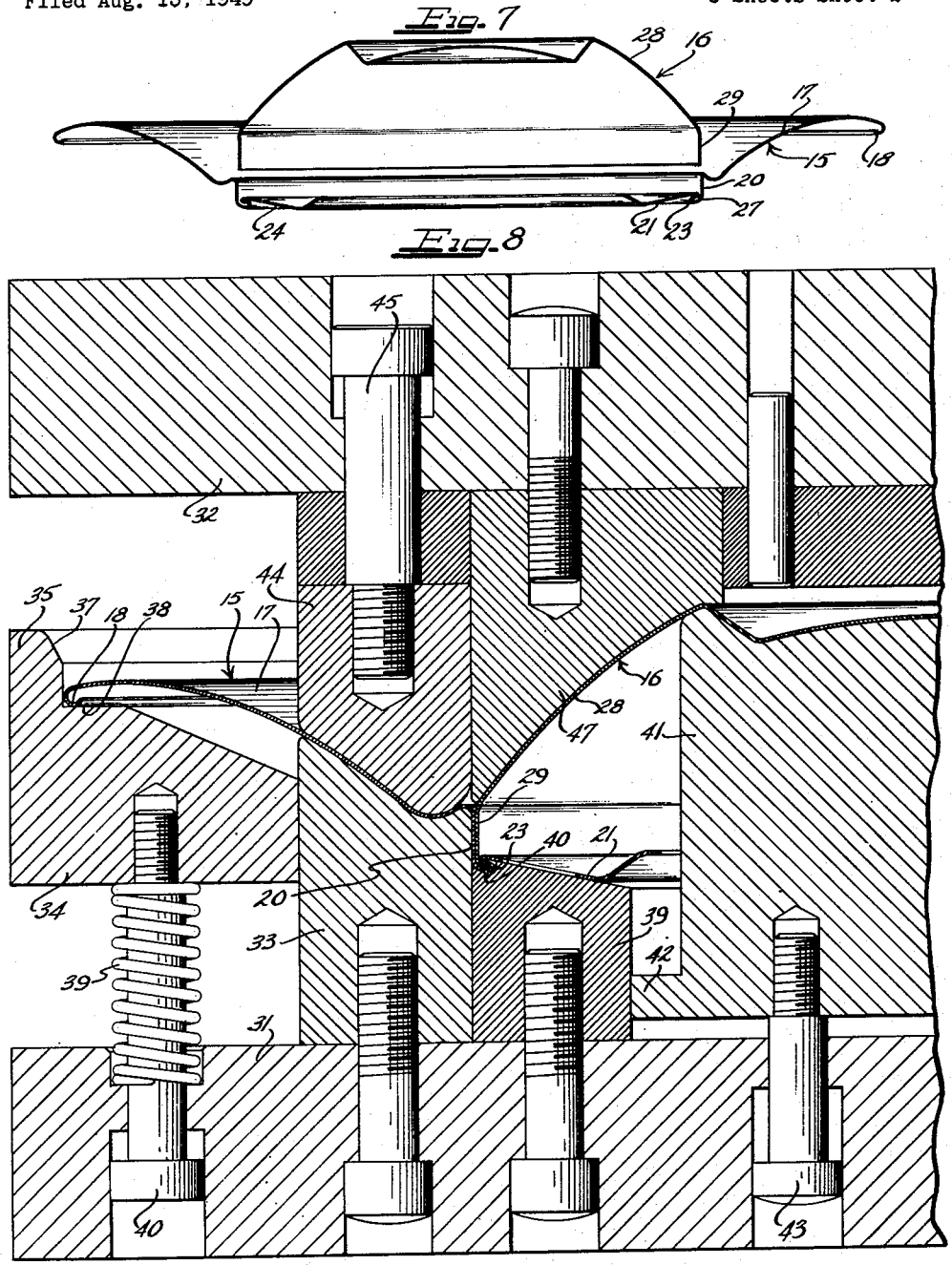

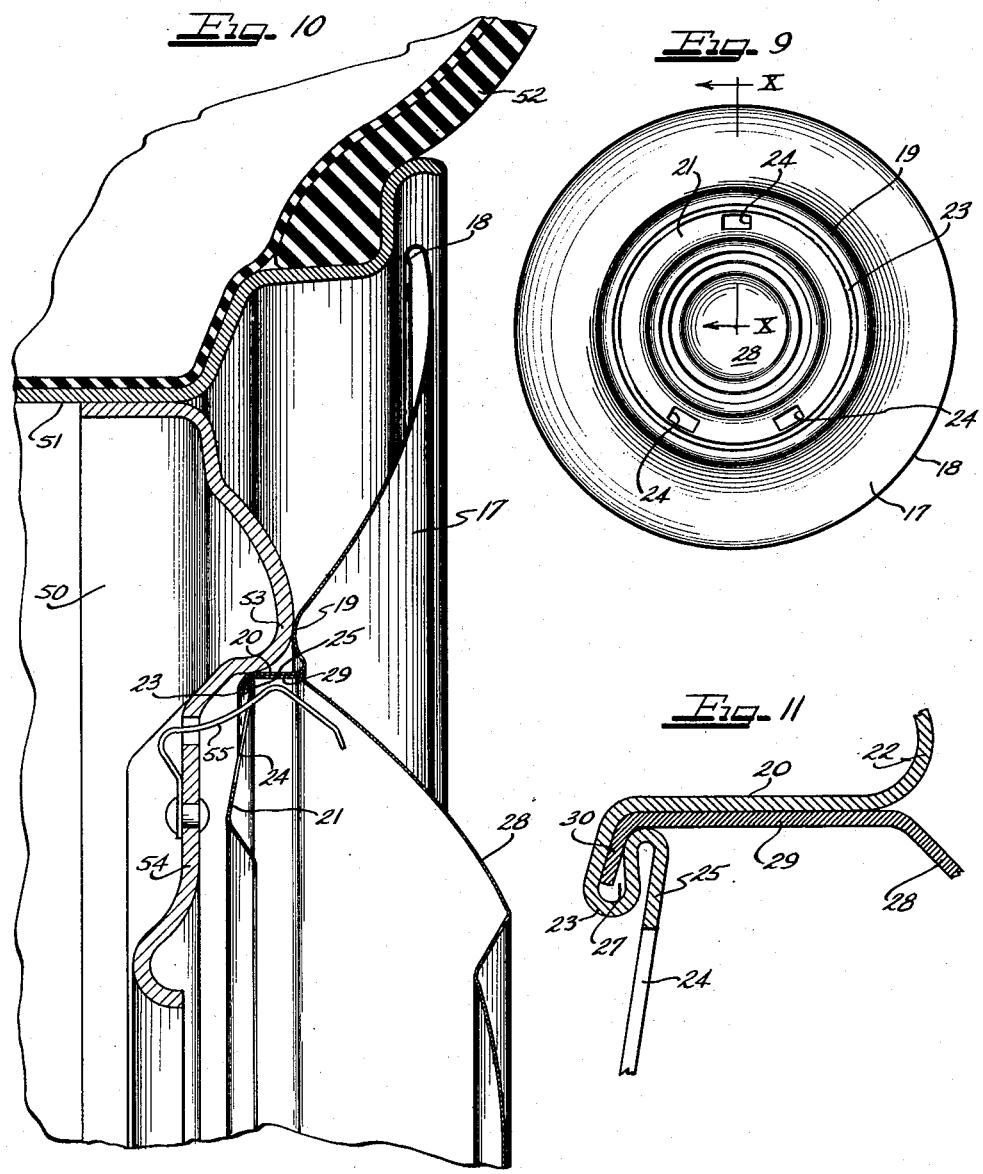

United States Patent Office 2,700,354
Patented Jan. 25, 1955

2,700,354

METHOD AND APPARATUS FOR MAKING WHEEL COVERS

George Albert Lyon, Detroit, Mich.

Application August 13, 1949, Serial No. 110,099

6 Claims. (Cl. 113—116)

The present invention relates to improvements in making wheel covers and more particularly concerns making wheel covers adapted to be applied to the outer side of vehicle wheels such as automobile wheels.

An important object of the present invention is to provide improvements in the manufacture of vehicle wheel covers of composite structure.

Another object of the invention resides in the improved method of assembling a pair of circular wheel covers into permanent, interlocked unitary assembly.

A further object of the invention is to provide an improved method of making a reinforced wheel cover structure.

According to the general features of the present invention there is provided in a method of making a vehicle wheel cover the steps of substantially completely forming a circular wheel cover member with a generally radially lying fold therein, preforming a second circular cover member with a marginal flange of a diameter to register with said fold, and assembling the cover members by driving the margin of the second cover member into interengaged relation within said fold.

According to other general features of the invention the method includes the step of supporting the fold portion of the first cover member rigidly in stationary relation and driving the marginal portion of the second cover member into the rigidly held fold.

According to further general features of the invention there is provided an improved method of making a vehicle wheel cover including the steps of blanking a circular cover member from sheet material, drawing an inner area of the cover blank into axially inset position, punching retaining clip apertures in the inset portion of the cover blank, and folding an annular portion of the cover blank at the radially outer sides of the apertures into a double reverse bent fold to reinforce the area of the inset cover portion engageable by retaining clips on a wheel to which the cover may be applied.

Other objects, features and advantages of the present invention will be readily apparent from the following detailed description of a preferred embodiment of the invention in view of the accompanying drawings in which:

Figure 1 is a diametrical sectional view through a wheel cover component showing the same after the initial blanking thereof;

Figures 2, 3, 4 and 5 are enlarged fragmentary sectional views of the cover component shown in Figure 1 and taken in the same plane but showing the same following successive steps in the forming thereof;

Figure 6 is a diametrical sectional view through a second cover component showing the same blanked and prepared for assembly with the cover component of Figure 5;

Figure 7 shows the cover components coaxially disposed preparatory to final assembling thereof;

Figure 8 is a fragmentary radial vertical sectional view through an assembly die unit showing the cover components permanently united by the die assembly;

Figure 9 is a rear elevational view of the composite cover assembly;

Figure 10 is an enlarged radial sectional view taken substantially on the line X—X of Figure 9 and showing the cover applied to the outer side of a vehicle wheel; and Figure 11 is an enlarged fragmentary detail sectional view of the juncture portions of the cover components and taken in substantially the same plane as shown in Figure 10.

As shown on the drawings:

The method of the present invention will be best understood by reference to the various figures of the drawing which disclose successive steps in the method.

In making the cover, separate cover components 15 (Figure 1) and 16 (Figure 6) are separately formed and subsequently permanently assembled. In the present instance the cover portion or component 15 is in the form of an annulus while the cover portion or component 16 is in the form of a central crown portion.

The cover annulus 15 is blanked from appropriate sheet material such as thin gauge sheet metal. In the initial blanking of the cover annulus 15 it is formed with a radially outer annular portion 17 of convex cross section, defined at its outer margin by a flat hold-down flange 18. At the inner margin of the annular portion 17 is formed a generally radially inwardly extending narrow intermediate flange portion 19 merging on a radius with a generally axially extending flange portion 20. Extending generally radially inwardly from the axially inner end of the flange portion 20 is an annular retaining flange portion 21.

In the second step of the forming method, the intermediate flange portion 19 is formed into generally ogee curvature in cross section to provide a generally axially outwardly projecting annular reinforcing rib 22 at juncture with the axial flange 20 while the remainder of the flange 19 is on a concave radius defining a generally axially inwardly extending rib. At the same time the inset inner flange 21 is offset axially outwardly from its original position to form at juncture with the flange 20 a return bent open annular rib 23.

Thereafter as shown in Figure 3 the inset flange 21 is punched out as indicated by the parallel dash lines P to form the same with retaining clip accommodating apertures 24 which, as shown in Figure 9, may comprise three in number formed on a common circle and with the radially outer margins defined by a narrow rim portion 25 of the flange. At the same time the outer marginal flange 18 is trimmed to proper size as indicated by the dash line T.

In a succeeding forming step as shown in Figure 4, the trimmed flange 18 is turned substantially axially rearwardly.

Formation of the cover member 15 is completed, as shown in Figure 5 by curling under the marginal flange 18 to provide a reinforcing bead at the periphery of the cover. At the same time the rib 23 is collapsed by turning the radially outer side thereof radially inwardly into substantially radial angular direction from the axial flange 20 to provide a generally S-shaped fold having a mouth 27 opening generally radially outwardly and axially outwardly adjacent juncture of the fold with the flange 20.

Formed as a separate member or cover portion, the cover member 16 is drawn or stamped to shape providing the same with a generally convex crown 28 of a diameter to fit within the diameter of the axial flange 20 of the annular cover member 15. At the margin the crown portion 28 is provided with an axially inwardly extending marginal flange 29 of a diameter to fit in substantially snug complementary telescoped relation within the flange 20.

The components 15 and 16 of the cover are now ready to be permanently assembled together to provide a unitary cover structure. To this end, the cover components are brought into concentric relation as shown in Figure 7 with the crown marginal flange 29 disposed opposite the mouth 27 of the reinforcing fold 23. Final assembly is then effected by relatively moving the cover components axially to drive the flange 29 into the fold mouth 27 until the inner terminal portion of the flange 29 cams radially inwardly against the bottom side defining the mouth 27 and is bent radially inwardly into the form of an interlock terminal flange 30 interengaging within the fold 23 as best seen in Figures 8, 10 and 11. As a result the cover components are permanently assembled into a unitary structure. In effecting the final assembled relationship of the cover components, a cover uniting die assembly as shown in Figure 8 is preferably used. This die assembly includes the usual die base or bed plate 31 and cooperating head plate 32. The bed plate 31 is adapted to be mounted fixedly upon the bed of a press, while the head plate 32 is adapted to be carried by the ram portion of a press.

The bed plate 31 carries means for supporting the annular cover component 15 and including a supporting ring 33 contoured complementary to the inner side of the ogee ribs 19 and 22 and the adjacent portion of the outer convex section 17 of the ring cover member and providing a backing for the axial flange 20. Slidably encircling the supporting ring 33 is a preliminary supporting and centering ring 34 provided with an upper radially outer marginal centering flange or series of centering fingers 35 provided with a sloping lead-in surface 37 and rising from a horizontal supporting surface or platform 38 receptive of the reinforced margin 18 of the cover ring in cover centering relation. Coiled compression springs 39 arranged about respective guide studs 40 normally support the centering ring 34 in an elevated relation enabling the cover ring 15 to be quickly and easily placed in position thereon clear of the supporting ring 33. The preliminary supporting ring 34 also serves as a stripper after the cover assembly has been completed.

At the inner side of the supporting ring 33 is an anvil ring 39 which is contoured complementary to the central attachment flange 21 and the fold 23 of the cover ring and providing a solid backing therefor. To receive and solidly support the fold 23 during the cover assembling operation, the upper outer margin of the supporting ring 39 is formed with a complementary groove 40 which, it will be observed, has a radially inwardly sloping bottom wall against which the similarly sloping bottom wall of the fold 23 defining the fold mouth 27 rests firmly.

Also supported by the bed plate 31 and reciprocably vertically slidably guided by the cover supporting ring 39 is a central vertically reciprocably movable crown-supporting plug 41. A slidable guiding relationship with the inner cylindrical surface of the ring 39 is afforded by a radial guide flange 42 on the plug 41, while canting is avoided by guide studs 43 operating through the bed plate 31, while compression springs (not shown) normally urge the plug 41 upwardly to a position, limited by the heads of the studs 43 wherein the crown cover member 16 is supported above the ring member 15. For proper centering of the crown upon the plug 41 the upper surface of the plug 41 is contoured complementary to the inner surface of the crown member.

After the cover members 15 and 16 have been assembled upon the supporting members carried by the bed plate 31, the head plate or block 32 is moved downwardly so that a hold down ring 44 carried by the head block will drive against the cover ring outer section 17 substantially as shown in Figure 8 and cause the supporting ring 34 to be depressed until the supporting ring 15 is driven tight against the stationary supporting ring 33. In this position the fold 23 is solidly cradled in the backing groove 40. In order to have the hold down ring 44 function in advance of pressing the crown 16 into position, guiding and protraction limiting studs 45 slidable in the head plate 32 carry the ring 44 and appropriate springs (not shown), normally urge the hold down ring 44 into protracted position.

Succeeding the hold down ring 44 in operation, a presser ring 47 fixedly carried by the head plate 32 and contoured complementary to the major outer face area of the crown 28 to and overlying the axial flange 29 bears down upon the crown cover portion and drives the same axially to slide the flange 29 axially along the inner surface of the axial flange 20 of the ring cover member until the extremity of the flange 29 cams generally radially inwardly along the bottom wall defining the mouth of the fold 23 and is turned generally radially inwardly into interlocked relationship within the fold, the fold being all the while solidly supported by the anvil ring 39 within the cradle groove 40. It may be mentioned that in order to assure a tight interengagement of the interlock flange terminal 30 within the groove mouth 27, the groove mouth is initially collapsed to a greater extent than the thickness of the terminal flange 30 so that as the flange is forced into the groove mouth a strong frictional grip clamping the same within the groove mouth results. Furthermore, the outside diameter of the crown marginal flange 29 is preformed to at least the inside diameter of the ring member flange 20 so that a snug frictional engagement results in the finished product. Substantial concentricity in the final laminated flanges 20 and 29 is maintained by the encircling wall of the supporting ring 33.

Following final assembly of the cover components, the die head 32 is raised, and the supporting ring 34 and the supporting plug 41, acting as strippers raise the cover unit from the base die structure. After complete separation of the die components, the plug member 41 raises the cover unit above the supporting ring 34 by reason of the greater elevation to which the plug 41 is permitted to extend, as will be evident upon comparison of the limit range of the studs 40 and 43, respectively, as shown in Figure 8.

Before assembly of the cover components or after removal of the cover unit following assembly the outer surfaces of the cover may be appropriately finished in any manner desired as by polishing, plating, enameling, or any combination of such finishes.

The completed cover is adapted to be applied to the outer side of a vehicle wheel as shown in Figure 10 and which may comprise a more or less conventional wheel structure including a wheel body 50 supporting a tire rim 51 and which in turn is adapted to support a pneumatic tire and tube assembly 52. The wheel body has an annular reinforcing generally axially outwardly extending nose bulge 53 defining a bolt-on flange 54 carrying a plurality of retaining spring clips 55. The cover is properly dimensioned so that it may be applied to the outer side of the wheel by generally coaxially disposing the cover with respect to the wheel and with the head portions of the clips 55 extending through the clip clearing apertures 24 in the retaining flange 21. Then the cover is pressed axially inwardly to cam the clip heads past the strongly reinforced multi-layer fold 23 until the clips snap into retaining engagement with the clip engageable margin 25 of the cover. At the same time the cover rib 19 seats against the nose bulge 53 and the cover flange 20 opposing the radially inner side of the nose bulge 53 retains the cover centered on the wheel. The radially outer reinforced edge 18 of the cover preferably remains in spaced relation to the tire rim terminal flange for brake drum cooling air circulation purposes. To remove the cover a pry-off tool may be inserted between the reinforced outer marginal edge 18 and the tire rim and pry-off force applied to spring the cover free from the retaining clips 55. The rigid reinforcement afforded by the multi-layer and multi-flange, multi-bend fold 23, flange 30 and clip engageable margin 25 assures that the clip engaged portion of the cover will remain free from any distortion.

It will be understood that modifications and variations may be effected without departing from the scope of the novel concepts of the present invention.

I claim as my invention:

1. In a method of making vehicle wheel covers, the steps of blanking a circular cover member from sheet material, drawing an inner area of the cover blank into axially inset position with an axially extending flange joining said inner area of the blank with the outer area of the blank, offsetting said inner area axially outwardly from the position into which it was originally inset, and during the offsetting shaping the material of said area at the radially inner side of the juncture of the inner area with said axially extending flange to form a return bent annular rib projecting axially inwardly beyond said now offset inner area, punching retaining clip receiving apertures in said inner area adjacent to said rib, and thereafter collapsing said rib radially inwardly into a double reverse bent fold at the radially outer sides of said apertures.

2. In a method of making vehicle wheel covers, the steps of blanking a circular cover member from sheet material, drawing an inner area of the cover blank into axially inset position with an axially extending flange joining said inner area of the blank with the outer area of the blank, offsetting said inner area axially outwardly from the position into which it was originally inset, and during the offsetting shaping the material of said area at the radially inner side of the juncture of the inner area with said axially extending flange to form a return bent annular rib projecting axially inwardly beyond said now offset inner area, punching retaining clip receiving apertures in said inner area adjacent to said rib, thereafter collapsing said rib radially inwardly into a double reverse bent fold at the radially outer sides of said apertures, and assembling a crown cover component having an axially extending flange of substantially the same diameter as the inside diameter of said axially extending flange between said inner and outer areas, by forcing said crown component axial flange axially inwardly inside said axially extending juncture flange and driving the edge of said crown component flange into said reverse bent fold to interlock the same therein.

3. In combination in apparatus for assembling a trim ring component with a crown component of a wheel cover and wherein the trim ring component has an annular outer portion and an annular inner portion inset substantially relative to the outer portion with an axially extending juncture flange between the annular portions including a reverse bent radially outwardly opening fold at the juncture of the inner portion with the flange, an annular yieldably supported member for initially receiving and supporting the outer marginal part of the outer annular portion of the trim ring, a stationary annular member normally spaced under the radially inner part of said outer annular portion and having an axially extending inner surface disposed to receive slidably the radially outer side of said axial flange, a yieldable annular member operable downwardly in an axial direction to bear against the upper side of said radially inner trim ring part opposite said stationary annular member to drive said inner annular part thereagainst and depress said yieldable member, an annular second stationary member thereupon engageable by the inner portion of the trim ring and providing a stationary support for said fold, a yieldable supporting member mounted coaxially within said second stationary member and adapted normally to support the cover crown in elevated position with an axial flange thereof substantially concentric above and radially inside said trim ring flange, and a member engageable with the cover crown and movable relative to all of the remaining members to push said cover crown toward said trim ring to drive the flange of the cover crown along said trim ring axial flange and into said fold for interlocking the cover crown with the trim ring, said movable outer trim ring supporting member and said movable crown supporting member being cooperable to lift the assembled cover from said annular stationary members and said crown supporting member being movable upwardly further than said movable trim ring supporting member to lift the cover assembly substantially thereabove.

4. In a method of making a vehicle wheel cover, drawing a circular first cover member into a radially outer generally radially extending portion and a radially inner axially inwardly inset portion and with a generally axially extending flange connecting said portions, axially outwardly offsetting said radially inner portion from its original position relative to said flange and coincident with such offsetting shaping a narrow annular area of said inner portion radially inwardly of said flange into a return bent axially outwardly opening and axially inwardly projecting annular rib, collapsing and turning said rib under and generally radially inwardly into a fold to lie in reenforcing relation to the superposed radially outer marginal area of said inner portion, shaping a second circular cover member to provide it with a generally axially extending flange of a diameter to fit closely within said axial flange of the first mentioned cover member, and axially inwardly driving said axially extending flange of said second cover member into the axially extending flange of the first mentioned cover member continuously until the axially inner portion of the axially extending flange of the second cover member has been forced radially inwardly into assembled interlocked relation within said fold.

5. In a method of making a vehicle wheel cover, drawing a circular first cover member into a radially outer generally radially extending portion and a radially inner axially inwardly inset portion and with a generally axially extending flange connecting said portions, axially outwardly offsetting said radially inner portion from its original position relative to said flange and coincident with such offsetting shaping a narrow annular area of said inner portion radially inwardly of said flange into a return bent axially outwardly opening and axially inwardly projecting annular rib, collapsing and turning said rib under and generally radially inwardly into a fold to lie in reenforcing relation to the superposed radially outer marginal area of said inner portion, shaping a second circular cover member to provide it with a generally axially extending flange of a diameter to fit closely within said axial flange of the first mentioned cover member, supporting the turned under fold of said first mentioned cover member solidly and backing the axially extending flange of the first mentioned cover member against buckling radially outwardly, and then driving said axially extending flange of the second cover member axially inwardly along the axially extending flange of said first mentioned cover member and endwise into said fold until the axially inner portion of said axially extending flange of the second cover member has been moved into assembled interlocked relation within said fold.

6. In a method of making a vehicle wheel cover, drawing a circular first cover member into a radially outer generally radially extending portion and a radially inner axially inwardly inset portion and with a generally axially extending flange connecting said portions, axially outwardly offsetting said radially inner portion from its original position relative to said flange and coincident with such offsetting shaping a narrow annular area of said inner portion radially inwardly of said flange into a return bent axially outwardly opening and axially inwardly projecting annular rib, collapsing and turning said rib under and generally radially inwardly into a generally radially extending fold underlying the adjacent radially outer marginal area of said inner portion and with a radially outwardly opening mouth adjacent to said axially extending flange and with the sides of the mouth closely related, shaping a second circular cover member to provide a generally axially extending annular flange of a diameter to fit closely within said axially extending flange of the first cover member, and of a material thicker than the space between the sides of said mouth, and axially driving the axially extending flange of the second cover member telescopically into the axially extending flange of the first cover member until the axially inner end of said axially extending flange of the second cover member enters into said mouth between said sides of the mouth of the fold to thereby interlock the second cover member with the first cover member.

References Cited in the file of this patent

UNITED STATES PATENTS

| | | |
|---|---|---|
| 2,183,220 | Horn | Dec. 12, 1939 |
| 2,188,911 | Lyon | Feb. 6, 1940 |
| 2,205,008 | Gray | June 18, 1940 |
| 2,239,368 | Lyon | Apr. 22, 1941 |
| 2,293,067 | Lyon | Aug. 18, 1942 |
| 2,304,581 | Lyon | Dec. 8, 1942 |
| 2,347,206 | Lyon | Apr. 25, 1944 |
| 2,358,984 | Lyon | Sept. 26, 1944 |
| 2,368,229 | Lyon | Jan. 30, 1945 |
| 2,386,236 | Lyon | Oct. 9, 1945 |
| 2,505,780 | Lyon | May 2, 1950 |
| 2,664,318 | Lyon | Dec. 29, 1953 |